United States Patent Office 2,949,480
Patented Aug. 16, 1960

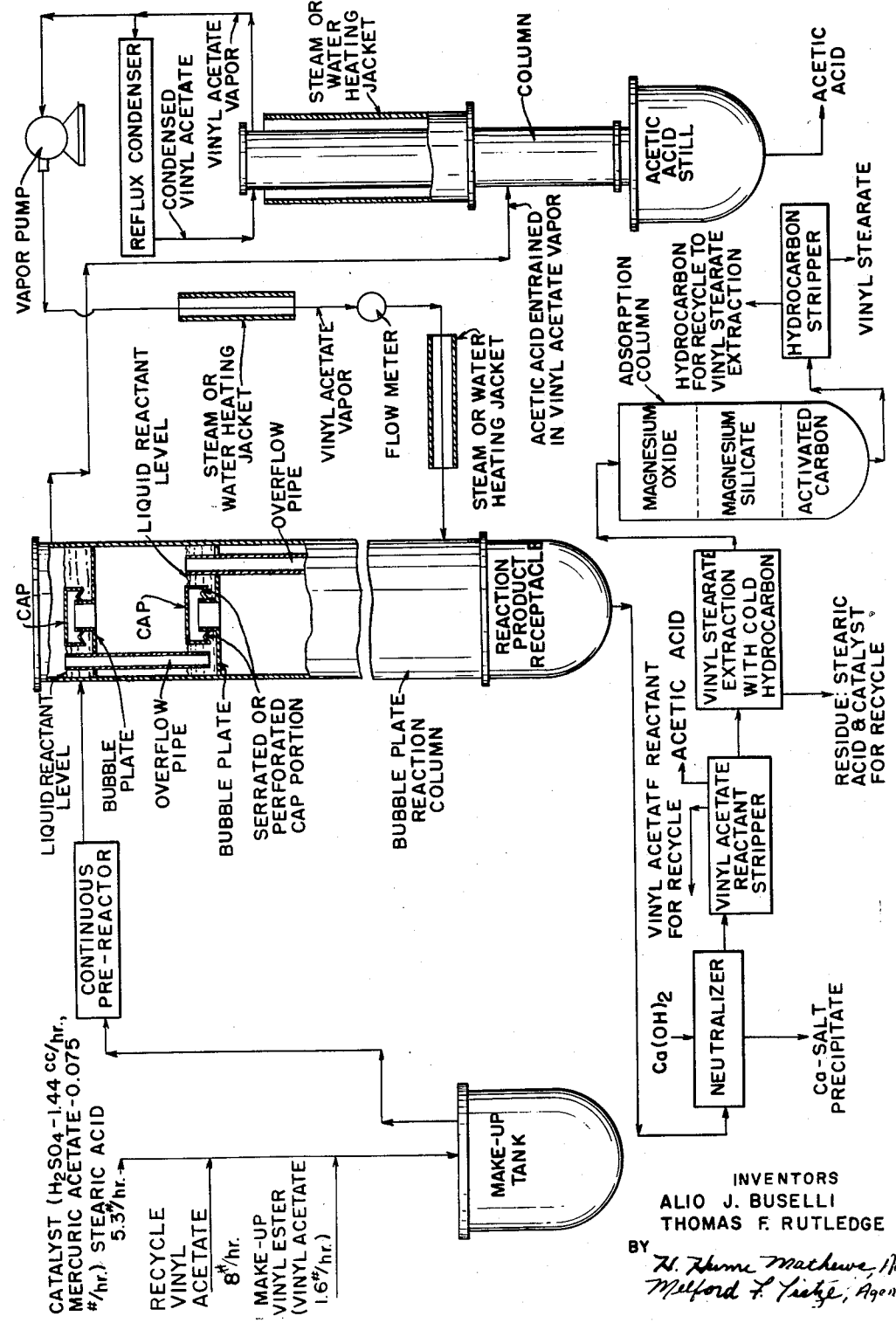
INVENTORS
ALIO J. BUSELLI
THOMAS F. RUTLEDGE

2,949,480

PREPARATION OF VINYL STEARATE

Alio J. Buselli, New Providence, and Thomas F. Rutledge, Madison, N.J., assignors to Air Reduction Company, Incorporated, New York, N.Y., a corporation of New York Filed Aug. 27, 1956, Ser. No. 606,496

17 Claims. (Cl. 260—410.9)

This invention relates to a novel method of preparing vinyl stearate by a vinyl interchange or transvinylation reaction between a vinyl ester reactant and stearic acid. The invention includes a novel method of separating and purifying the vinyl stearate product by extracting the vinyl stearate with a non-polar paraffin hydrocarbon having seven or less carbon atoms. The invention further includes a novel overall method for preparing vinyl stearate as well as other novel features hereinafter disclosed. The vinyl stearate monomer formed according to this invention is useful for the production of vinyl stearate polymers which are, in turn, useful for forming emulsion paints and coating compositions and as a chewing gum base.

The production of vinyl stearate by a vinyl interchange reaction involves the reaction between stearic acid and a vinyl ester reactant or transvinylation agent. The reaction is reversible and may be shown by the following equation illustrating the use of vinyl acetate as the vinyl ester reactant.

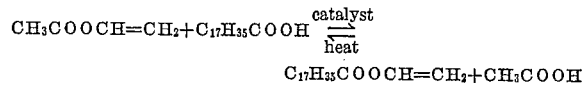

$$CH_3COOCH=CH_2 + C_{17}H_{35}COOH \underset{heat}{\overset{catalyst}{\rightleftharpoons}}$$
$$C_{17}H_{35}COOCH=CH_2 + CH_3COOH$$

Generally, the vinyl interchange reaction can be carried out batch-wise or advantageously in a continuous process, but in each case, the reaction involves heating a mixture of stearic acid and a vinyl ester in the presence of a vinyl interchange catalyst to form the vinyl stearate and the corresponding by-product acid of the vinyl ester reactant.

The crude reaction product contains in addition to the vinyl stearate product and the by-product acid, unreacted vinyl ester reactant, unreacted stearic acid and the vinyl interchange catalyst together with some additional small amounts of other impurities such as ethylidene diesters. The purification of the crude reaction product in order to obtain a high grade monomer vinyl stearate having good polymerization properties is important and this invention relates to a novel and advantageous method of purifying the crude reaction product obtained.

According to this invention, the crude reaction product is first neutralized with a suitable neutralizing agent as hereinafter described and any precipitate which may be formed as a result of the neutralization separated from the crude reaction product.

The volatiles, including the unreacted vinyl ester reactant and the by-product acid are then removed from the crude reaction product. As hereinafter described, it is advantageous to remove the formed by-product acid during the reaction to improve both the yield and the quality of the vinyl stearate. If the by-product acid is removed during the reaction, very little, if any, by-product acid will be present in the crude reaction product in which case it will only be necessary to remove the vinyl ester reactant and possibly a small amount of by-product acid at this point. The removal of the by-product acid during the reaction also simplifies the subsequent purification of the crude reaction product as herein described and results in a more effective and efficient purification.

The vinyl ester reactant and any remaining by-product acid can be efficiently and readily removed from the crude reaction mixture by evaporation or distillation as described below in more detail in the specification and specific example.

Whether the by-product acid is removed entirely or partly during the reaction or entirely or partly by evaporation or distillation after the reaction has been terminated, the resulting crude reaction product still contains the vinyl stearate product, unreacted stearic acid, and the vinyl interchange catalyst together with some additional small amounts of impurities such as ethylidene diesters.

We have found a novel and advantageous method of separating the vinyl stearate from the stearic acid present in the reaction product and in addition a novel and advantageous method of cleanly separating the vinyl stearate from both the stearic acid and a mercury vinyl interchange catalyst.

According to the invention, vinyl stearate is separated from the stearic acid by extracting the vinyl stearate with a paraffin hydrocarbon solvent having seven or less carbon atoms. The hydrocarbon solvent can simply be poured into the mixture containing the vinyl stearate and the stearic acid, the mixture stirred until the extraction is complete. The solids are permitted to settle to a sludge, which is mostly stearic acid, and the sludge separated by filtration or decantation.

Some examples of paraffin hydrocarbons which can be used include heptane, hexane, pentane, butane, propane and also mixtures of hydrocarbon solvents such as petroleum ether which is a mixture of pentanes and hexanes.

As noted above, the reaction mixture after it has been neutralized and stripped of the vinyl ester reactant also contains some mercury catalyst compound in addition to the vinyl stearate, stearic acid and small amounts of other unknown impurities. We have further found that a very efficient and advantageous separation of both the stearic acid and the mercury catalyst compound from the vinyl stearate can be effected by using a hydrocarbon extractant having less than 6 carbon atoms such as pentane and propane. Pentane is the most advantageous solvent since it is liquid at room temperature and is easier to work with and requires less complicated extraction equipment than a normally gaseous hydrocarbon such as propane. The use of hydrocarbons which are gases at room temperature would require pressure equipment.

Separation of the stearic acid and also the mercury catalyst from the vinyl stearate in a one-step extraction process simplifies the over-all process and readily permits the recovery of the mercury catalysts and also of the unreacted stearic acid.

We have also found that the temperature at which the extraction is carried out is important, particularly with respect to cleanly separating the mercury catalyst compound from the vinyl stearate. In general, as the extraction temperature is increased, more mercury catalyst compound is extracted along with the vinyl stearate. We have found that if the extraction temperature is maintained below about 15° C., that a most effective and clean separation of the mercury catalyst from the vinyl stearate in addition to the stearic acid can be effected. In actual practice, we prefer to use an extraction temperature between about 0° C. and 5° C. This temperature range is especially effective when pentane is used as the extracting medium.

The amount of hydrocarbon solvent should, of course, be sufficient to dissolve all of the vinyl stearate as will be apparent to those skilled in the art. The use of a slight excess of hydrocarbon is advantageous to eliminate the disadvantages in handling a saturated solution.

The extraction of the vinyl stearate from the stearic acid and/or the mercury vinyl interchange catalyst can be accomplished in various manners. For example, the hydrocarbon and the crude vinyl stearate product can merely be mixed together at room temperature, cooled to below about 15° C., and the insoluble residue separated therefrom. The solid vinyl stearate crude product can be added to the cold hydrocarbon while maintaining the temperature below about 15° C. and the insoluble residue removed. We have found that it is advantageous method-wise to add the hot molten vinyl stearate crude reaction product directly to the hydrocarbon solvent which had previously been cooled to about 0° C. The crude vinyl stearate can merely be poured into the hydrocarbon solvent. The crude vinyl stearate in the hot molten state is usually at a temperature of about 60° C. when poured into the cold hydrocarbon. The temperature usually does not rise much above 15° C., but in any event, it is advantageous to cool the mixture to about 0° C. to 5° C. as above disclosed before effecting the separation. When using this procedure, the extraction is almost instantaneous. The mixture can be stirred for a minute or so and then separated as disclosed above.

The hydrocarbon solvent can then be readily removed by evaporation or distillation and the vinyl stearate product recovered. The resulting vinyl stearate is substantially pure and can be used to form vinyl stearate polymers and advantageously vinyl stearate copolymers such as vinyl stearate-vinyl acetate copolymers. If the hydrocarbon solvent used is pentane, most of the pentane is removed at atmospheric pressure at a pot temperature of 80° C., and the remaining pentane can be removed by gradually reducing the pressure.

The resulting vinyl stearate can also be further purified by distillation or by liming or both. The distillation purification can be carried out in a short path distillation apparatus under vacuum. The liming purification can be accomplished by dissolving the vinyl stearate in a hydrocarbon solvent such as pentane and adding thereto about 3% of the weight of the vinyl stearate of calcium hydroxide together with about 1.5% of the weight of the vinyl stearate of water. The mixture can then be stirred for about one hour at room temperature, filtered and the hydrocarbon removed by distillation. If desired, the liming purification can be carried out with the hydrocarbon extract of the vinyl stearate resulting from the separation of the vinyl stearate from the stearic acid.

The use of the hydrocarbon solvents below six carbon atoms as above described for separating vinyl stearate from stearic acid and the mercury catalyst unaccountably has some sort of salting out effect which prevents the extraction of significant amounts of the mercury catalyst salt along with the vinyl stearate. This action is especially apparent when the extraction temperature is maintained as disclosed above. This phenomenon permits a more efficient separation and catalyst recovery.

We have found, however, that the vinyl stearate obtained from the crude reaction product by hydrocarbon extraction can be very effectively and advantageously further purified by contacting the vinyl stearate with a series of adsorbents comprising a magnesium oxide, a magnesium silicate and an activated carbon.

Various other types of equivalent adsorbents can also be used but we have found that an activated carbon marketed by the West Virginia Pulp and Paper Co. under the trade name "Nuchar C–190–N," a hydrous magnesium silicate marketed by Westvaco Chemical Co. under the trade name "Magnesol," and a magnesium oxide marketed by Westvaco Mineral Products under the trade name "Sea Sorb" are advantageous adsorbents. The three adsorbents can be used in different orders but more effective results are obtained by first contacting the vinyl stearate with magnesium oxide, then magnesium silicate and lastly activated carbon.

The adsorbents can merely be added to the hydrocarbon vinyl stearate extract and stirred for about an hour in a batch-type operation, the adsorbents filtered off and the hydrocarbon stripped from the vinyl stearate. Although a pure monomer grade vinyl stearate can be obtained in this manner, it is more advantageous from a method standpoint to place the adsorbents in an adsorption column and pass the hydrocarbon vinyl stearate extract through the adsorption column. It is also advantageous to place the adsorbents in the adsorption column in the form of a hydrocarbon slurry of the same hydrocarbon as was used to extract the vinyl stearate. The vinyl stearate can be contacted with the adsorbents while it is in a molten state, however, it is more advantageous to contact the vinyl stearate while it is dissolved in a solvent such as pentane.

The amounts of adsorbents used will, of course, vary depending upon the amount of vinyl stearate to be purified, the rate at which the vinyl stearate extract is passed through the column, etc. In any event, the amount of adsorbents and the rate of flow through the column should be adjusted so that the extract leaving the column contains a pure monomer grade vinyl stearate. Examples of amounts of adsorbents and the rate of flow of the hydrocarbon extract through the column are set forth below in the specific example. It is generally more effective to use about equal quantities of magnesium silicate and magnesium oxide, and activated carbon in a quantity amounting to about ⅕ of the magnesium silicate or magnesium oxide.

The use of the adsorbents in combination with the hydrocarbon extraction of the vinyl stearate results in a particularly high grade or pure vinyl stearate having excellent polymerization properties. The extraction of the vinyl stearate with a hydrocarbon of less than 6 carbon atoms removes practically all of the stearic acid and mercury catalyst permitting the economic use of an adsorption purification which ordinarily would have to be of such a size as to be commercially impractical.

The adsorbents used as disclosed herein are particularly advantageous since it has been unexpectedly found that at least one-half of the stearic acid and virtually all of the vinyl stearate can be recovered from the adsorbents after they have been used.

The extracted vinyl stearate before being treated with the adsorbents as noted above contains very small amounts of unreacted acid, mercury, and other impurities. The vinyl stearate also contains small amounts of coloring matter. The vinyl stearate first contacts the magnesium oxide which removes most of the remaining unreacted stearic acid plus a small amount of mercury and color. The vinyl stearate next contacts the magnesium silicate which removes most of the mercury, any remaining unreacted stearic acid in addition to other unknown impurities. The magnesium silicate as noted above, also removes stearic acid and it is thus advantageous to first contact the vinyl stearate with the magnesium oxide to first remove most of the stearic acid and thus save the adsorptive power of the magnesium silicate for the removal of most of the mercury and the other impurities that the magnesium oxide will not effectively remove. The vinyl stearate is then contacted by the activated carbon which removes the remaining color and a little of the mercury which may remain. The use of the combination of adsorbents noticeably aids in the production of a monomer grade vinyl stearate free from inhibitors and having improved polymerization properties.

The vinyl interchange reaction between the stearic acid and vinyl ester reactant can be advantageously carried out by removing the vinyl ester reactant by-product acid from the reaction mixture during the reaction. The equilibrium of the reaction is shifted in the direction favoring the formation of the vinyl stearate and considerably improves the yield and quality of the vinyl stearate product. We have consistently obtained yields of vinyl stearate by the process of this invention in excess of 95%. The removal of the by-product acid also simplifies the isolation and purification of the crude vinyl stearate reaction product and quite generally improves the over-all process of this invention. The removal of the by-product acid also considerably reduces the formation of other undesirable by-products, such as ethylidene diesters which are very difficult to remove from the vinyl stearate. The presence of such impurities hinders the polymerization properties of the vinyl stearate.

The by-product acid can be removed from the reaction medium in an advantageous manner by entraining it in the vapor of the vinyl ester reactant. Entrainment is a physical phenomenon which involves the mixing of two or more vapors. For example, when stearic acid and vinyl acetate are being reacted at the vinyl interchange reaction temperature, acetic acid is formed as the by-product acid as the reaction progresses. Due to the vapor pressure of the acetic acid at the reaction temperature, acetic acid vapor is present in the reaction mixture. When another vapor such as the vapor of vinyl acetate is passed through and removed from the reaction mixture, the acetic acid vapor caused by the vapor pressure of the acetic acid is entrained in the vinyl acetate vapor and removed from the reaction along with the vinyl acetate vapor. As the acetic acid vapor is removed more acetic acid vapor is formed as the acetic acid liquid-vapor phases return to equilibrium. Continued passage of the vinyl acetate vapor through the reaction mixture continuously entrains the acetic acid vapor, removes it from the reaction mixture upsetting the acetic acid liquid-vapor equilibrium and forcing more acetic acid into the vapor phase.

The by-product acid can be entrained in different ways. For example, the vinyl ester reactant can be rapidly distilled from the reaction mixture while fresh vinyl ester is simultaneously added to the reaction to maintain the correct level or proportions of the reactants. The vinyl ester vapor formed by reason of the distillation entrains or entraps the by-product acid. The vinyl ester vapor together with the by-product acid entrained therein is then removed from the reaction vessel through a short vapor path and can be followed by condensation of the vapors, and removal of the by-product acid rendering the vinyl ester reactant suitable of reuse or recycle in a continuous process. The vinyl ester vapor containing the by-product acid should be removed from the reaction vessel when using this procedure by means of a vapor path which is sufficiently short to prevent reflux or fractionation. Fractionation occurring in the vapor path causes return of the by-product acid to the reaction mixture and results in poor removal of the by-product acid. A type of apparatus suitable for removing the vapors without fractionation can consist of a reaction vessel fitted with a short wide tube bent at a greater than 90° angle so that the tube slopes slightly downward and away from the reaction vessel. Part of the sloping portion of the tube can be jacketed so that cold water can be circulated around it to condense the vapors.

Other entrainment vapors can also be advantageously used with the vinyl ester reactant vapor such as n-heptane to aid in entraining the by-product acid. A particularly effective entrainment and removal of the by-product acid can be accomplished by passing the vapor of the vinyl ester reactant directly through the reaction mixture. The vinyl ester vapor can be passed through the reaction mixture is various ways. For example, the reaction vessel can be an ordinary three-necked flask having one end of a tube inserted therein and ending near the bottom of the flask and the other end connected to a separate vinyl ester reactant still. The vinyl ester vapor is formed in the still, passed through the tube, bubbled up through the reaction mixture entraining the by-product acid, and passed out through another neck in the flask to subsequent vinyl ester recovery.

An entrainment method such as that illustrated in the drawing is a particularly effective method. This method involves the passing of the reactants through a reaction column of the type shown in the drawing, which consists of a modified bubble plate distillation column. The reaction mixture enters the top of the column, as shown, and fills the first plate to the level of the over-flow pipe. It then flows through the over-flow pipe into the second plate until it is filled to the level of the over-flow pipe of the second plate and so on through the entire series of plates in the column. At the same time as the reaction mixture is being flowed through the column, vinyl ester vapor is fed to the bottom of the column and travels upwardly through the serrated or perforated portions of the bubble plate, as shown in the drawing, and is thus bubbled through the reaction mixture entraining the by-product acid. The entrained acid is removed from the top of the column and sent to vinyl ester recovery.

The number of plates in the reaction column can be varied considerably and will depend somewhat on the height of the liquid reactants permitted to collect in each plate. A 15 to 16 plate column is advantageous where the depth of the liquid reactants is maintained at about 2 to 3 inches. In this instance, the length of the reaction column can be about 3 feet and the diameter between 4 and 6 inches.

In passing the vinyl ester reactant vapor through the reaction mixture under the conditions herein set forth, the vinyl ester reactant level, or the proportion thereof to the stearic acid, is readily maintained due to condensation of the vinyl ester vapor in the reaction vessel.

The removal of the by-product acid by entraining it in the vinyl ester vapor passed or swept through the reaction mixture has many advantages including very effective removal of the acetic acid, reduced heat input to the reaction, improved agitation and the elimination of foaming of the reaction mixture, and also the elimination of build-up of the hydroquinone stabilizer from vinyl acetate when this ester is used as a reactant.

Removal of all of the by-product acid is, of course, advantageous. We have found that the advantages of removing the by-product acid can be obtained by removing as little as 45% of the theoretical by-product acid formed. It is advantageous, however, to remove at least about 60% or above of the by-product acid.

Other vinyl ester reactants or transvinylation agents can be used to transvinylate the stearic acid in place of the vinyl acetate used in the above equation according to this invention, including vinyl propionate, vinyl butyrate, vinyl valerate, vinyl hexoate, vinyl heptanoate and the like. When using vinyl ester reactants other than vinyl acetate, the corresponding acid of the vinyl ester reactant will be formed. We have found that particularly effective results are obtained when vinyl acetate is used as a transvinylation agent. Vinyl acetate forms acetic acid as a by-product acid and we have found that acetic acid can be readily and easily removed from the reaction medium by entrainment in vinyl acetate vapor and at a temperature sufficiently low to prevent degradation or polymer formation in the reaction mixture. Acetic acid entrained in vinyl acetate vapor is also easily recovered therefrom in pure form permitting efficient recycle of pure vinyl acetate vapor to the reaction mixture to remove more acetic acid. The use of esters higher than vinyl acetate generally requires higher reaction temperatures and in some instances reduced pressures may be necessary to maintain low reaction temperatures to prevent degradation and polymer formation in the reaction mixture.

The mol ratio of the vinyl ester reactant to the stearic acid can be varied over a fairly wide range. An excess of the vinyl ester reactant is desirable and we have found that it is advantageous to use about 6 mols of the vinyl ester reactant to one mol of the stearic acid. More vinyl ester could be used if desired, but there is no apparent advantage in doing so. Less vinyl ester could also be used but, when the amount is decreased below about 3 mols of vinyl ester to one mol of stearic acid, the yield of the vinyl stearate is correspondingly reduced.

The stearic acid used as a reactant according to this invention need not necessarily be completely pure and can contain some palmitic acid. Commercial stearic acid generally contains varying amounts of palmitic acid. We have found that stearic acid containing up to about 30% palmitic acid can be successfully used as a reactant. If a stearic acid containing much in excess of 30% palmitic acid is used, the vinyl stearate becomes increasingly difficult to separate from the stearic acid and the mercury catalyst by use of a hydrocarbon solvent such as pentane.

Various catalysts can be used to promote the vinyl interchange reaction of this invention. The mercury salt-strong acid catalysts are most effective and, especially, the mercury salt-sulfuric acid catalysts. Various mercury compounds can be used in conjunction with the acids, including mercuric oxide, mercuric acetate and mercuric stearate. Other acids which can be used in conjunction with the mercury compounds beside sulfuric acid include phosphoric, p-toluene sulfonic and trifluoroacetic acids.

The amount of acid used to form the catalyst to promote the vinyl interchange reaction between a vinyl ester and stearic acid is important in the over-all reaction herein described. When using sulfuric acid as the acid catalyst, the range which can effectively be used is between about 0.0031 and 0.0046 mol of sulfuric acid per mol of stearic acid, or expressed in other terms, between about 0.110 and 0.156 gram of sulfuric acid per 100 grams of stearic acid. These limits may vary slightly when different acids are used. If a different acid is used, it should be used in an amount to produce equivalent results to the range set forth above for sulfuric acid. If much less than 0.110 gram of sulfuric acid per 100 grams of stearic acid is used, the reaction rate or yield is considerably reduced. It is more important, however, to maintain the concentration of the sulfuric acid below about 0.156 gram per 100 grams of stearic acid. The use of too much sulfuric acid results in the formation of a cloudy or milky, gummy reaction product. Such a product is very difficult to filter and is otherwise unmanageable. Even when the product is filtered, there is loss of vinyl stearate and a reduced yield. The impurities formed by the use of too much acid catalyst are believed to be polymers of some sort. These formed impurities also adsorb significant quantities of the mercury catalyst which is difficult to recover and prohibits direct recovery and recycle of the mercury catalyst. The acid catalyst range as disclosed above is advantageous only when using the method of this invention wherein the by-product acid is removed from the reaction mixture and the reaction continued to substantial completeness. In a straight low yield vinyl interchange reaction from which the by-product acid is not removed, no advantages are gained by maintaining the amount of acid below the range herein disclosed.

It is advantageous to use about 0.012 mol of mercury compound per mol of stearic acid in conjunction with the acid. However, the amount of mercury compound can be safely varied about 10% in either direction without appreciably affecting the reaction. Expressed in a mol ratio, the practical limits of mercury compound would be between about 0.014 and 0.011 mol of mercury compound per mol of stearic acid. Too little mercury compound slows down the reaction and too much mercury can cause polymer formation during the subsequent treatment and purification of the reaction product.

It is also advantageous to pre-react the vinyl ester reactant and the stearic acid before beginning the removal of the by-product acid from the reaction mixture. By pre-reacting, the reaction is allowed to proceed well towards its equilibrium point before beginning the by-product acid removal. Generally, when the reaction mixture has proceeded to substantial equilibrium, the by-product acid is present in about 8 to 10%. The pre-reaction can be accomplished in various manners, such as by refluxing, as will be apparent to those skilled in the art. Generally, refluxing of the reaction mixture between 45 and 60 minutes is sufficient. Pre-reacting the reactants prior to beginning the by-product acid removal makes possible more efficient removal of the by-product acid with the use of less vinyl ester reactant vapor and the entire over-all method requires considerably less time.

After the reactants have been pre-reacted, entrainment of the by-product acid is begun. The reaction is continued during the entrainment at a temperature just below the boiling point of the reaction mixture until it is substantially complete.

The reaction temperature can be varied somewhat depending upon a number of variables such as the particular vinyl ester used and the method of removing the by-product acid. Generally, we have found that it is advantageous to carry out the reaction exactly at the reflux or boiling temperature of the reaction mixture. At this temperature the by-product acid has an appreciable vapor pressure and condensation of the vinyl ester reactant vapor used to entrain the by-product acid is prevented. The pre-reaction temperature is advantageously maintained just short of the reflux temperature of the reaction mixture or at very mild reflux. For example, when vinyl acetate is used as the vinyl ester reactant, we have used reaction temperatures between 75° C. to 85° C. but have found a reaction temperature between about 78° C. to 80° C. to be advantageous.

The product resulting after the transvinylation reaction has been completed contains in addition to the vinyl stearate product, the active catalyst, unreacted vinyl ester reactant, some unreacted stearic acid together with other more minor impurities. Since most of the by-product acid was removed during the reaction, very little, if any, is present in the final crude reaction product.

The reaction product or the sulfuric acid present in the crude reaction product, is then neutralized by adding a sufficient amount of neutralizing agent to the crude product. Various neutralizing agents can be used such as sodium acetate trihydrate, magnesium silicate, magnesium oxide, and calcium acetate but calcium hydroxide is a particularly effective and advantageous neutralizing agent and quite superior to other neutralizing agents as disclosed in the copending United States application of Charles Brown, Serial No. 606,212, filed August 27, 1956, and assigned to the same assignee as the present application. Less calcium hydroxide is necessary to effectively neutralize the catalyst and all of the calcium can be easily removed by filtration immediately after the neutralization without any loss of mercury in the filtration residue. The amount of calcium hydroxide necessary to neutralize the sulfuric acid or active catalyst can be readily calculated based on the amount of acid used to form the active catalyst although an excess is desirable. For example, when 0.0024 mol of concentrated sulfuric acid are used, about 0.8 gram of calicum hydroxide is sufficient to effect the neutralization. The calcium hydroxide should be thoroughly dispersed throughout the reaction product and generally the neutralization will be complete in about one-half hour. Keeping the reaction product hot, about 60° C., and continuously stirring it, aids in the neutralization. The calcium salts formed during the neutralization are separated from the reaction product. The neutralization of the active catalyst is important and should be done as soon as possible because the reaction can reverse itself quite rapidly in the presence of the active catalyst if very much of the acetic acid is permitted to remain in the reaction product. The neutralization is also important to prevent other undesirable effects which might result from the presence of the active catalyst in the reaction product such as polymerization, decomposition, excessive color formation and the like during the removal of the unreacted vinyl ester reactant or by other subsequent treatments.

The unreacted vinyl ester reactant or solvent is next stripped from the reaction product. The stripping of the vinyl ester reactant should be carefully controlled to prevent degradation or polymerization of the remaining components in the reaction mixture. We have found that the removal or stripping of the vinyl ester reactant can be effectively carried out under vacuum. For example, when the vinyl ester reactant is vinyl acetate, the vinyl acetate can be stripped from the reaction product by placing it in a distillation pot and heating it until the temperature reaches about 25-35° C. and a vacuum applied when this temperature is reached. The vacuum can be applied by means of a vacuum pump and the pressure gradually lowered so that the mixture boils rapidly without splashing or foaming. As the pressure is gradually lowered to about 1-2 mm., the reaction product can be heated further and the heating and vacuum continued until all of the vinyl acetate has been removed. Any by-product acid present which was not removed by entrainment is removed from the reaction product during the removal of the vinyl ester reactant solvent. Other methods can, of course, be used to strip the vinyl ester reactant from the reaction product as will be apparent to those skilled in the art.

The crude reaction product, after the vinyl ester reactant has been removed contains mainly vinyl stearate, unreacted stearic acid, and the catalyst together with some additional small amounts of other impurities. The vinyl ester product is then separated therefrom by extraction in accordance with this invention as hereinbefore described. In addition, the vinyl ester product can advantageously be further purified by adsorption as herein described.

The accompanying drawing is a flow sheet illustrating a particular process and particular types of apparatus which can advantageously be used according to this invention. The method disclosed in the drawing is related to the specific reaction between vinyl acetate, stearic acid, with a mercury acetate-sulfuric acid catalyst for the purpose of describing and setting forth a specific example of the continuous process. Variations in the reactants, catalysts, and method can, of course, be made as described herein and as will be apparent to those skilled in the art.

As shown in the drawing, the reactants and catalyst are continuously fed into a make-up tank. The rate of feed as shown in 5.3 pounds of stearic acid per hour and a total of 9.6 pounds of vinyl ester reactant per hour. This forms a mol ratio of vinyl ester to stearic acid of about 6 to 1. The mercury acetate is fed into the make-up tank at 0.075 pound per hour and the concentrated sulfuric acid at 1.44 ml. per hour. The amount of sulfuric acid being fed amounts to about 0.119 gram for every 100 grams of the stearic acid feed. A slurry is formed in the make-up tank at room temperature. The reaction slurry can be heated in the make-up tank to bring the components of the reaction slurry into solution or the reaction slurry can be passed through a heat-exchanger (not shown in the drawing) to accomplish the same purpose. In either event, the temperature used to bring the components into solution can be considerably varied but is generally maintained just sufficient to bring the components rapidly into solution within a reasonable time, for example, about 20 minutes.

From the make-up tank or heat exchanger the reaction mixture is fed to a continuous pre-reactor in which the vinyl interchange reaction mixture is pre-reacted and is carried to substantial equilibrium. The continuous pre-reactor can be of similar construction to known continuous reactors. The pre-reactor can be fitted with a water or steam jacket, not shown in the drawing, for supplying heat to promote the reaction and constructed to prevent back circulation. This can be accomplished by placing baffles in the pre-reactor tube or by regulating the length and diameter.

The pre-reactor is maintained at a temperature just below the boiling temperature of the lowest boiling constituent in the reaction mixture or at reflux temperature. The time that the reaction mixture takes to pass through the pre-reactor tube will, of course, depend upon many variables such as the length and diameter of the tube, rate of flow therethrough and the temperature. The size of the pre-reactor tube, rate of flow and other variables should be so regulated that the reaction mixture exiting from the continuous pre-reactor is approximately at equilibrium. We have found that the time necessary to bring the reaction mixture to substantial equilibrium is generally between 45 and 60 minutes, when the reaction temperature is maintained at reflux temperature. To maintain the reaction mixture at the reaction temperature in the pre-reactor for the required period of time to bring it to substantial equilibrium, a pre-reactor tube of about 3 feet in length and about 4 to 6 inches in diameter is advantageous and the rate of flow so adjusted to exit the reaction mixture approximately at equilibrium. The vinyl stearate reaction mixture at substantial equilibrium generally contains between about 8 to 10% vinyl ester reactant acid, which in the process illustrated in the drawings would be acetic acid.

The vinyl stearate reaction mixture is then fed to the top of a bubble plate reaction column and flowed over the bubble plates down through the column at the same time that vinyl acetate vapor is fed to the bottom of the column. As disclosed in more detail above, the vinyl ester vapor passes through the reaction mixture, entraining the by-product acid and removing it from the reaction mixture to permit the reaction to progress towards the formation of vinyl stearate. The vinyl acetate vapor having the by-product acid entrained therein is removed from the top of the reaction column and fed to vinyl acetate recovery, for recycling to the bottom of the reaction column.

The length, diameter, rate of flow of the reaction mixture and the number and construction of the bubble plates are so regulated that when the vinyl stearate reaction mixture reaches the bottom of the reaction tower and enters the reaction product receptable, it is substantially free from acetic acid as explained above. The rate of flow of the reaction mixture through the pre-reactor and the reaction column is advantageously the same rate as the reaction mixture feed to the make-up tank. Under the conditions set forth above and in the drawing, the time of the pre-reaction is about 1 hour and the time the reaction mixture remains in the reaction column is about 2 hours.

The vinyl stearate reaction product is then transferred to a neutralizing vessel where it is neutralized, advantageously with calcium hydroxide, and separated from the salts resulting from the neutralization as disclosed above in more detail.

The vinyl acetate and other low boiling components such as any remaining acetic acid, are then stripped from the reaction product by evaporation and the vinyl acetate recycled.

The reaction product is then transferred to the extraction column where it is extracted with a hydrocarbon or pentane solvent, separated from the residue, and passed through the adsorption column to further purify the vinyl stearate as disclosed above. The hydrocarbon is stripped from the vinyl stearate by evaporation, condensed and recycled to the extraction vessel for reuse.

The residue from te hydrocarbon or pentane extraction contains most of the mercury catalyst and some unreacted stearic acid and is recycled to the original make-up for continuing the reaction. Any loss of mercury catalyst can be made up by adding additional mercury to the recycled mercury. Generally, it is not necessary to add more than 10–15% mercury salt to make up that lost during the reaction.

The vinyl acetate vapors which are bubbled through the reaction mixture entraining the by-product acetic acid can be recovered from the by-product acetic acid in various ways. For example, the by-product acid can be adsorbed by a selective adsorbent. An example of a selective adsorbent when acetic acid is the by-product acid and is to be separated from vinyl acetate is finely divided magnesium oxide such as that marketed by the Westvaco Mineral Products Division of the Westvaco Chemical Company under the trade name "Sea Sorb." The magnesium oxide readily adsorbs the acetic acid and passes through pure vinyl acetate suitable for reuse or recycle. An adsorption column containing the magnesium oxide can be used and the amount of magnesium oxide and the length of the column required can readily be determined by standard tests of the existing vinyl acetate.

The particular process shown in the drawing is very advantageous and involves transferring the vinyl ester vapors together with the entrained by-product acid to a distillation column maintained at a temperature below the boiling point of the by-product acetic acid, but above that of the vinyl acetate. The vinyl acetate vapor comes off the top of the column and is split into two portions, one portion is condensed and returned to the top of the column and the other recycled to the bottom of the reaction column. The column is best operated adiabatically and the recycled vinyl acetate vapor is superheated sufficiently to control the amount of vinyl acetate liquid reactant in the lower portion of the reactor. Advantageously the liquid vinyl acetate entering and leaving the column are the same. The rate of feed or recycle vinyl acetate to the bottom of the reaction column is about 10 cubic feet per minute. The vinyl acetate vapor is also fed into the reaction column under about 6 inches of mercury and at about 175° F.

The present invention provides a novel, effective and advantageous process for producing pure, monomer grade vinyl stearate in consistently high yields of 95% and above. The vinyl stearate produced according to this invention is superior in both physical and chemical properties to vinyl stearate produced by other processes. The vinyl stearate is easily polymerized and forms excellent polymers. The various novel individual steps of the process of this invention can be co-operatively incorporated in a continuous large-scale process resulting in a more efficient, more economical, simplified process for the production of high purity vinyl stearate in higher yields than was heretofore possible.

*Example 1.*—The reaction vessel used was a one liter flask which was connected to a condenser and a calibrated receiver through a short wide tube bent at an angle slightly greater than 90°. A still pot was connected to the reaction flask by means of a U-shaped tube which ended near the bottom of the reaction flask. The reaction flask and still pot was thoroughly dried by heating it and purging it with nitrogen. A nitrogen atmosphere was maintained in the system during the run. 390 ml. (4.2 mols) of vinyl acetate were placed in the reaction flask together with 1.9 grams (0.0087 mol) of mercuric oxide. 0.13 ml. (0.0024 mol) of concentrated sulfuric acid were slowly added to the reaction flask at the rate of one drop per second through a 1 ml. pipette graduated in one-hundredth milliliters while constantly stirring the mixture. 200 grams (0.7 mol) of stearic acid were then added to the mixture and the reaction mixture heated to its boiling point. The heating of the reaction mixture was continued at this temperature with stirring for one hour. At the end of this time vinyl acetate vapor formed from in the separate still pot was passed or bubbled through the reaction mixture by means of the U-shaped tube extending into the reaction mixture. The vinyl acetate vapor was passed through the reaction mixture at the rate of 500 ml. every 18 minutes for 2½ hours. The vinyl acetate vapor containing the entrained acetic acid is removed from the reaction vessel by means of the short wide bent tube and passed through the condenser into the receiver. During the 2½ hour entrainment period, about 4,000 ml. of vinyl acetate and entrained acetic acid were collected. Throughout the 2½ hour entrainment, the reaction temperature was maintained just at the boiling point or reflux temperature of the reaction mixture. At the end of the 2½ hour period, the reaction mixture was retained at just below its boiling point for ½ hour longer.

A slurry of 0.8 gram of calcium hydroxide in 5 ml. of vinyl acetate was then added to the reaction mixture to neutralize the sulfuric acid or the reaction mixture. The mixture was stirred for ½ hour with heating to keep the mixture hot (60° C.). At the end of this time the mixture was completely neutralized and three grams diatomaceous earth marketed by Johns-Manville under the trade name "Hyflo Super Cel" was added as a filter aid and the stirring continued for another three minutes. The neutralized reaction mixture was then filtered through a dry mat of "Hyflo Super Cel" prepared on a Büchner funnel. The reaction mixture was filtered while it was still hot with a small amount of suction and the residue and filter aid washed with small amounts of fresh vinyl acetate. The residue weighed about two grams.

The clear filtrate was then stripped of volatiles consisting mostly of vinyl acetate and a small amount of acetic acid by placing it in a still pot heated by an oil bath. The reaction mixture was heated in the still pot to a temperature which varied between 25° C. and 35° C. and a vacuum applied thereto by means of a vacuum pump. The pressure was gradually lowered so that the mixture boiled rapidly without splashing or foaming. When the pressure was lowered to between 1 to 2 mm., the oil bath was heated to 110° C. and the heating discontinued. From the time the pot temperature reached 95° C. heating and pumping were continued for 15 minutes. The volatiles were collected and the vacuum slowly released. The hot, molten crude vinyl stearate weighed 220 grams.

The crude, molten vinyl stearate was then extracted with n-pentane by pouring it slowly into 1250 ml. of cold (1–2° C.) n-pentane. The temperature of the mixture gradually increased to about 15° C. The mixture was stirred slowly for 1½ hours and the mixture cooled to below 5° C. Stirring was stopped after 1½ hours and the solids allowed to settle out for ½ hour. Most of the solids settled to a sludge having a volume of about 300 ml. in 5 to 10 minutes. The supernatant pentane-vinyl stearate extract was withdrawn by suction into a suitable container. The remaining mixture was transferred to cold (below 15° C.) centrifuge tubes and centrifuged for three minutes at 3000 r.p.m. The clear pentane extract was decanted from the tubes and combined with the main pentane extract. The solid material or residue from the pentane extractions in the centrifuge tubes was transferred to an evaporating vessel. To avoid loss of materials, particularly mercury, all apparatus was rinsed with chloroform. The residue was dried in the evaporating dish. The dried solid contained most of the mercury originally charged into the reaction vessel and was suitable for recycle for another vinyl stearate reaction.

The pentane extract containing the vinyl stearate was kept cold (below 15° C.) until the final purification step was carried out. The final purification step was carried out by passing the pentane extract through an absorption column charged with 20 grams of magnesium oxide marketed by Westvaco Mineral Products under the trade name "Sea Sorb," 20 grams of hydrous magnesium silicate marketed by Westvaco Chemical Company under the trade name "Magnesol," and 4 grams of activated carbon marketed by the West Virginia Pulp and Paper Company under the trade name "Nuchar C-190-N," in the order named. The adsorbents were charged into the adsorption column in the form of pentane slurries before the pentane extract was passed through them. The pentane extract was passed through the adsorbents at approximately 5 ml. per minute. At the end of the operation, the column was allowed to drain as completely as possible. 15 grams of vinyl stearate was eluted from the column by passing 100 ml. of fresh pentane through it.

The pentane was then stripped by distillation from the vinyl stearate. The final vinyl stearate was colorless and weighed about 200 grams. Upon cooling the vinyl stearate solidified to a white, waxy solid. The iodine number was 80.4 and the vinyl stearate product exhibited excellent polymerization properties.

We claim:

1. The method of separating vinyl stearate from a mixture of vinyl stearate and stearic acid which comprises extracting the vinyl stearate from the mixture with a paraffin hydrocarbon solvent having no more than seven carbon atoms.

2. The method of separating vinyl stearate from a mixture of vinyl stearate and stearic acid which comprises extracting the vinyl stearate from the mixture with pentane.

3. The method of separating vinyl stearate from a mixture of vinyl stearate, stearic acid and a mercury salt which comprises extracting the vinyl stearate from the mixture with a paraffin hydrocarbon solvent having no more than seven carbon atoms.

4. The method of claim 3 in which the extraction temperature is below about 15° C.

5. The method of separating vinyl stearate from a mixture of vinyl stearate, stearic acid and a mercury salt which comprises extracting the vinyl stearate from the mixture with pentane, and separating the vinyl stearate extract from the insoluble residue.

6. The method of claim 5 in which the extraction temperature is below about 15° C.

7. The method of purifying and separating vinyl stearate from a mixture of vinyl stearate and stearic acid which comprises extracting the vinyl stearate from the mixture with a paraffin hydrocarbon solvent having no more than seven carbon atoms, separating the vinyl stearate extract from the insoluble residue, removing the hydrocarbon from the vinyl stearate, and passing the vinyl stearate through a series of adsorbents comprising magnesium oxide, magnesium silicate and activated carbon.

8. The method of purifying and separating vinyl stearate from a mixture of vinyl stearate and stearic acid which comprises extracting the vinyl stearate from the mixture with a paraffin hydrocarbon solvent having no more than seven carbon atoms, separating the vinyl stearate extract from the insoluble residue, and contacting the hydrocarbon-vinyl stearate extract with a series of adsorbents comprising magnesium oxide, magnesium silicate and activated carbon.

9. The method of claim 8 in which the hydrocarbon solvent is pentane.

10. The method of purifying and separating vinyl stearate from a mixture of vinyl stearate, stearic acid and a mercury salt which comprises extracting the vinyl stearate from the mixture with a paraffin hydrocarbon solvent having no more than seven carbon atoms, separating the vinyl stearate-hydrocarbon extract from the insoluble residue and contacting the vinyl stearate with a series of adsorbents comprising magnesium oxide, magnesium silicate and activated carbon.

11. The method of claim 10 in which the extraction is carried out at a temperature below about 15° C.

12. The method of claim 10 in which the hydrocarbon is pentane.

13. The method of claim 12 in which the extraction is carried out at a temperature below about 15° C.

14. The method of making vinyl stearate by vinyl interchange reaction which comprises reacting with heat stearic acid and vinyl acetate in the presence of a mercury salt-sulfuric acid catalyst in which the total amount of sulfuric acid is less than about 0.0039 mol for every mol of stearic acid, to form a reaction mixture containing vinyl stearate and acetic acid, removing the acetic acid from the reaction mixture by entraining it in vinyl acetate vapor during the reaction and continuing the reaction until the reaction is substantially complete to form a reaction product containing vinyl stearate, unreacted vinyl acetate, unreacted stearic acid together with other minor amounts of impurities and containing only a small amount of acetic acid, neutralizing the catalyst, removing the volatiles from the reaction product, extracting the vinyl stearate from the remaining mixture with pentane at a temperature below about 15° C. and stripping the pentane from the vinyl stearate.

15. The method of forming vinyl stearate by vinyl interchange reaction which comprises reacting with heat stearic acid and a vinyl ester reactant in the presence of a vinyl interchange catalyst to form a reaction product comprising vinyl stearate and the by-product acid of the vinyl ester reactant, removing the by-product acid from the reaction product, continuing the reaction between the stearic acid and the vinyl ester reactant to substantial completeness, neutralizing the catalyst with calcium hydroxide with the resultant formation of a precipitate, removing the precipitate from the reaction product, removing the volatiles from the reaction product, extracting the vinyl stearate from the reaction product with a paraffin hydrocarbon solvent having no more than seven carbon atoms, contacting the vinyl stearate extract together with the hydrocarbon solvent with a series of adsorbents comprising magnesium oxide, magnesium silicate and activated carbon, and separating the pure vinyl stearate from the hydrocarbon solvent.

16. The method of making vinyl stearate by vinyl interchange reaction which comprises reacting with heat stearic acid and vinyl acetate in the presence of a mercury salt-sulfuric acid vinyl interchange catalyst in which the total amount of sulfuric acid is between about 0.110 and 0.156 gram for every 100 grams of stearic acid being reacted until the reaction is about at equilibrium to form a reaction mixture containing vinyl stearate and acetic acid together with other impurities, passing vinyl acetate vapor through the reaction mixture to entrain the acetic acid, removing the vinyl acetate vapor together with the entrained acetic acid from the reaction mixture while continuing the reaction between the vinyl acetate and the stearic acid at a temperature just below the boiling point of vinyl acetate until the reaction is substantially complete and substantially no acetic acid is present in the reaction product to form a reaction product containing vinyl stearate, unreacted vinyl acetate, unreacted stearic acid and active mercury salt-sulfuric catalyst together with other impurities, neutralizing the catalyst with calcium hydroxide resulting in the formation of a calcium salt precipitate, separating the reaction product from the precipitate, removing the volatiles from the reaction product, extracting the vinyl stearate from the reaction product with pentane at a temperature below about 15° C., passing the extracted vinyl stearate together with the pentane through a series of adsorption materials comprising magnesium oxide, magnesium silicate and activated carbon, and stripping the pentane from the pure vinyl stearate.

17. The cyclic continuous process of making vinyl stearate by vinyl interchange reaction which comprises forming a reaction make-up mixture comprising stearic acid, vinyl acetate and a mercury salt-sulfuric acid vinyl interchange catalyst in which the total amount of sulfuric acid is between about 0.110 and 0.156 gram for every 100 grams of stearic acid being reacted, passing the reaction mixture through a continuous reaction zone and reacting the stearic acid and vinyl acetate therein with heat so that when the reaction mixture reaches the exit end of the continuous reaction zone the reaction is at about equilibrium, passing the reaction mixture exiting from the continuous reaction zone downwardly through a second reaction zone and simultaneously passing vinyl acetate vapor in the form of small bubbles upwardly through the pubble plate reaction column to entrain the acetic acid in the vinyl acetate vapors while maintaining the temperature of the reaction mixture in the second reaction zone at just below the boiling temperature of the vinyl acetate, removing the vinyl acetate vapor together with the entrained acetic acid from the second reaction zone, separating the vinyl acetate vapor from the acetic acid, recycling the vinyl acetate vapor to the bottom of the second reaction zone, continuing passing vinyl acetate vapor through the reaction mixture until the reaction mixture is substantially free from acetic acid when it reaches the bottom of the reaction zone to form a reaction product containing at least vinyl stearate, unreacted stearic acid, unreacted vinyl acetate and catalyst, neutralizing the catalyst with calcium hydroxide resulting in the formation of a calcium salt precipitate, separating the reaction product from the precipitate, stripping the unreacted vinyl acetate and any acetic acid present from the reaction product, extracting the vinyl stearate from the reaction product with pentane at a temperature below 15° C., recycling the residue from the pentane extract comprising mercury catalyst for use in the make-up mixture, passing the extracted vinyl stearate together with the pentane through a series of adsorbent materials comprising magnesium oxide, magnesium silicate and activated carbon, stripping the pentane from the vinyl stearate and recovering the pure vinyl stearate product.

References Cited in the file of this patent

UNITED STATES PATENTS

| | | |
|---|---|---|
| 1,433,308 | Steffens | Oct. 24, 1922 |
| 1,891,402 | Craise et al. | Dec. 20, 1932 |
| 1,930,572 | Wait | Oct. 17, 1933 |
| 2,177,473 | Brant | Oct. 24, 1939 |
| 2,299,862 | Toussaint et al. | Oct. 27, 1942 |
| 2,586,860 | Port et al. | Feb. 26, 1952 |
| 2,642,389 | Cohen et al. | June 16, 1953 |
| 2,732,415 | Klinge | Jan. 14, 1956 |
| 2,599,836 | Johnson | June 10, 1956 |

FOREIGN PATENTS

| | | |
|---|---|---|
| 686,050 | Great Britain | Jan. 14, 1953 |

OTHER REFERENCES

Markley: Fatty Acids, 1947, pages 207–208.

Ralston: Fatty Acids and Their Derivatives, 1948, page 287.

Groggins: Unit Processes in Organic Syntheses, 4th Ed., 1952, page 620.